(12) United States Patent
Dormody et al.

(10) Patent No.: US 10,551,271 B2
(45) Date of Patent: Feb. 4, 2020

(54) DESIGNING A CALIBRATION SYSTEM FOR USE IN CALIBRATING UNSTABLE SENSORS

(71) Applicant: NextNav, LLC, Sunnyvale, CA (US)

(72) Inventors: Michael Dormody, San Jose, CA (US); Thomas Wolf, Mountain View, CA (US)

(73) Assignee: NextNav, LLC, Sunnyvale, CA (US)

( * ) Notice: Subject to any disclaimer, the term of this patent is extended or adjusted under 35 U.S.C. 154(b) by 454 days.

(21) Appl. No.: 15/288,274

(22) Filed: Oct. 7, 2016

(65) Prior Publication Data

US 2017/0023430 A1    Jan. 26, 2017

Related U.S. Application Data (60) Provisional application No. 62/240,190, filed on Oct. 12, 2015.

(51) Int. Cl.
*G01L 27/02* (2006.01)
*G01L 27/00* (2006.01)

(52) U.S. Cl.
CPC .................. *G01L 27/005* (2013.01)

(58) Field of Classification Search
CPC .............. G01D 18/00; G01L 27/005
See application file for complete search history.

(56) References Cited

U.S. PATENT DOCUMENTS

| | | | |
|---|---|---|---|
| 2004/0128097 A1 | 7/2004 | Lamarca | |
| 2007/0119228 A1* | 5/2007 | Reichl | F02D 41/042 73/1.59 |
| 2012/0182180 A1 | 7/2012 | Wolf | |
| 2014/0278186 A1* | 9/2014 | Herzl | G01N 33/0006 702/104 |

FOREIGN PATENT DOCUMENTS

EP    2626755 A1    8/2013

OTHER PUBLICATIONS

Form PCT/ISA/206, PCT/US2016/056072, "Invitation to pay additional fees and, where applicable, protest fee", 5 pages, EPO Form P04A42, PCT/US2016/056072, "Information on Search Strategy", 1 page, Date of Mailing Jan. 11, 2017.
Form PCT/ISA/220, PCT/US2016/056072, "Notification of Transmittal of the International Search Report and the Written Opinion of the International Searching Authority, or the Declaration", 1 page(s); Form PCT/ISA/210, PCT/US2016/056072, "International Search Report", 5 page(s); EPO Form P04A42, PCT/US2016/056072, "Information on Search Strategy", 1 page(s); Form PCT/ISA/237, PCT/US2016/056072, "Written Opinion of the International Searching Authority", 10 page(s). dated Mar. 7, 2017.

* cited by examiner

*Primary Examiner* — Lisa M Caputo
*Assistant Examiner* — Alex T Devito
(74) *Attorney, Agent, or Firm* — Kyle Pendergrass (57) ABSTRACT

Using a calibration sensor to calibrate an unstable sensor from a network of unstable sensors. Approaches for using a calibration sensor to calibrate the unstable sensor initially identify an unstable sensor in a geographic region to be calibrated by a calibration sensor using a model of environmental conditions for the geographic region, and then use the model to determine how to calibrate the unstable sensor using the calibration sensor.

32 Claims, 8 Drawing Sheets

FIG. 1A
(Placement of calibration sensor in existing network of unstable sensors)

FIG. 1B
(Placement of network of unstable sensors around calibration sensor)

DESIGNING A CALIBRATION SYSTEM FOR USE IN CALIBRATING UNSTABLE SENSORS

RELATED APPLICATIONS

This application relates to the following related application(s): U.S. Pat. Appl. No. 62/240,190, filed 12 Oct. 2015, entitled DESIGNING A CALIBRATION SYSTEM FOR USE IN CALIBRATING UNSTABLE SENSORS. The content of each of the related application(s) is hereby incorporated by reference herein in its entirety.

TECHNICAL FIELD

This disclosure relates to calibration of an unstable sensor in a network of unstable sensors using a calibration sensor.

BACKGROUND

Determining the exact altitude of a receiver can be quite challenging where typical positioning solutions are not reliable. Imprecise estimates of the receiver's altitude may have "life or death" consequences for the user. For example, an imprecise altitude estimate of a mobile phone operated by a user calling 911 can delay emergency response times when responding to the call, mainly because the imprecise altitude estimate can only narrow the user's position to several adjacent floors in a building instead of the exact floor at which the user is experiencing an emergency. In less dire situations, imprecise estimates of the user's position can negatively impact efforts to provide navigation to a desired destination.

Various solutions exist to estimate the altitude of a receiver, including the solution detailed by U.S. Patent Application Publication No. US 2012/0182180, published Jul. 19, 2012, which uses measurements of pressure from a network of pressure sensors and a measurement of pressure from the receiver to estimate the receiver's altitude. However, such solutions require pressure sensors that measure pressure within a tolerated error from true pressure (e.g. usually a tolerated error of no more than 10 Pascals for floor-level accuracy). Unfortunately, the pressure sensors in the network are often unstable and known to drift above the tolerated error. Thus, cost-effective approaches are needed to calibrate these unstable sensors so they produce measurements within the tolerated error from true pressure.

BRIEF DESCRIPTION OF THE DRAWINGS

FIG. 12A illustrates an embodiment of FIG. 11 where the calibration sensor of FIG. 1A and FIG. 1B is moved closer to a replacement sensor before calibrating the replacement sensor.

DETAILED DESCRIPTION

This disclosure includes various approaches for using a highly-accurate reference sensor to serve as a calibration sensor for a group of less accurate (i.e. unstable) sensors. The density at which calibration sensors must be placed in a network of unstable sensors such that all unstable sensors can be sufficiently calibrated by at least one of the calibration sensors may vary depending on the layout of the network, and also climate zones of the geographic region within which the network resides. These and other aspects are discussed below in relation to approaches for determining the density of calibration sensors needed to calibrate all of the unstable sensors in the network.

Figure 1A:
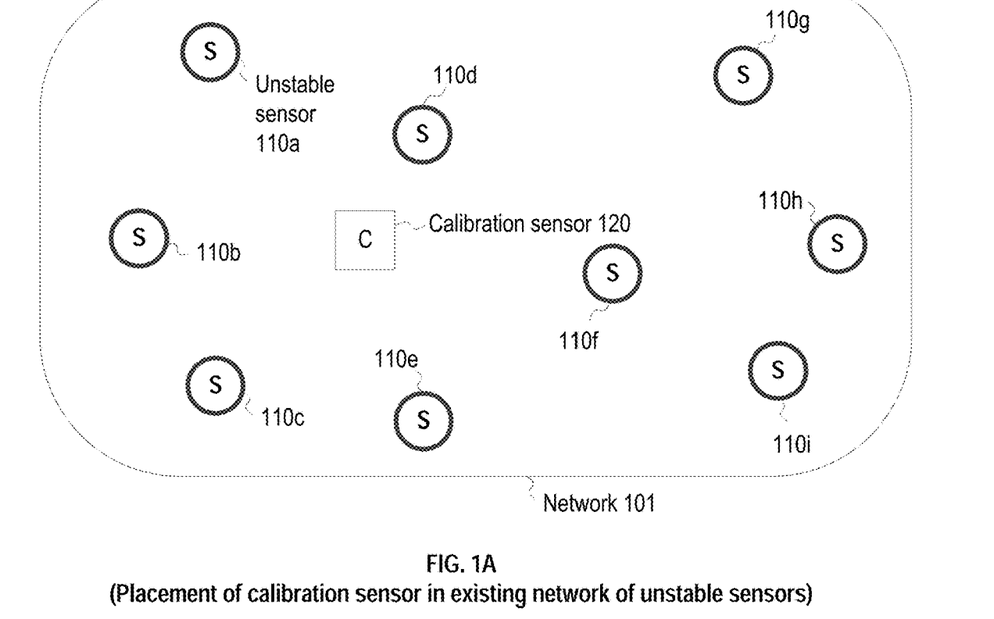
FIG. 1A and FIG. 1B depict a network of unstable pressure sensors and a calibration sensor.
Figure 1B:
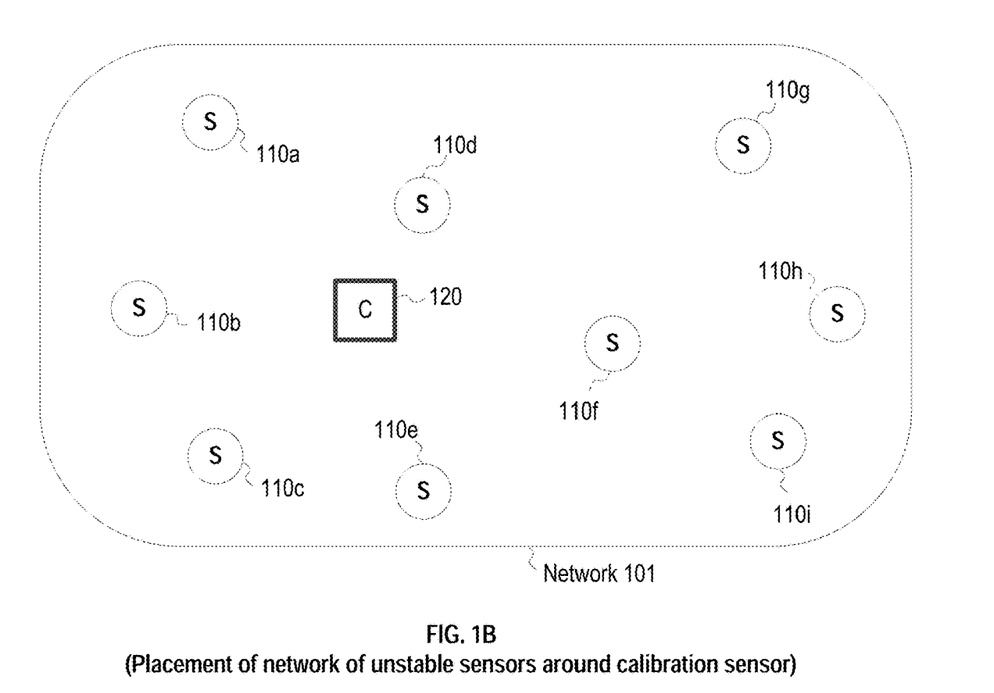

FIG. 1A and FIG. 1B depict a network 101 of unstable pressure sensors 110a-i (collectively referred to as "sensors 110"). The sensors 110 are unstable because they drift over time. Thus, a calibration pressure sensor 120, which has less drift than the sensors 110, has negligible drift, or can be frequently calibrated over some definable time period, is deployed in the network 101 to calibrate at least some of the sensors 110. By way of example, FIG. 1A depicts a first scenario where the sensors 110 are deployed before the calibration sensor 120 is deployed. This would be the case for an existing network that requires calibration using the approaches described herein. FIG. 1B, on the other hand, depicts a second scenario where the calibration sensor 120 is deployed before the sensors 110 are deployed. The scenario depicted by FIG. 1B could be used when a network is designed with calibration sensors in mind before that network is installed.

In some situations, as will be described later, the calibration sensor 120 cannot effectively calibrate all of the unstable sensors 110. Thus, it is beneficial to select a group of sensors from the unstable sensors 110 that will be calibrated by the calibration sensor 120. Approaches for selecting such a group are described below, as are approaches for using the calibration sensor 120 to calibrate the unstable sensors of that group. Additional calibration sensors can be deployed to calibrate the remaining unstable sensors in a network.

Figure 2:
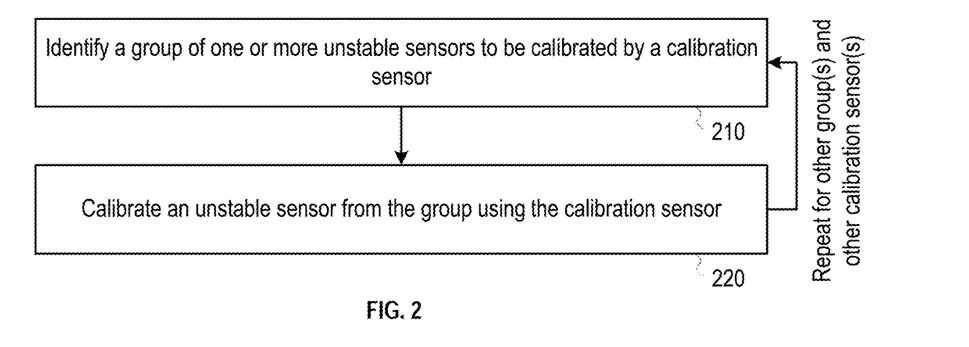
FIG. 2 shows a process for using a calibration sensor to calibrate an unstable sensor.

Attention is turned to FIG. 2, which shows a process for using the calibration sensor 120 to calibrate an unstable sensor from the unstable sensors 110. The process includes the steps of: identifying a group of one or more unstable sensors to be calibrated by a calibration sensor (step 210); and calibrating the unstable sensor from the group using the calibration sensor (step 220).

Details of steps 210 and 220 are provided below when describing processes illustrated in FIG. 7, FIG. 9 and FIG. 11. However, before discussing such details, it is helpful to understand how an unstable sensor can be calibrated using a calibration sensor. In one approach, an inaccurate pressure measurement from the unstable sensor is adjusted so its pressure measurements are closer to pressure measurements from the calibration sensor (assuming both sensors are at the same altitude). This is because the difference between a pressure measurement from the unstable sensor and a pressure measurement from the calibration sensor can be at least partially caused by drift of the unstable sensor. The drift of the unstable sensor may only partially contribute to the difference between the two pressure measurements because occasional and often unpredictable differences in localized weather at the location of the unstable sensor, and/or at the location of the calibration sensor, can also contribute to the difference between the two pressure measurements.

Figure 3:
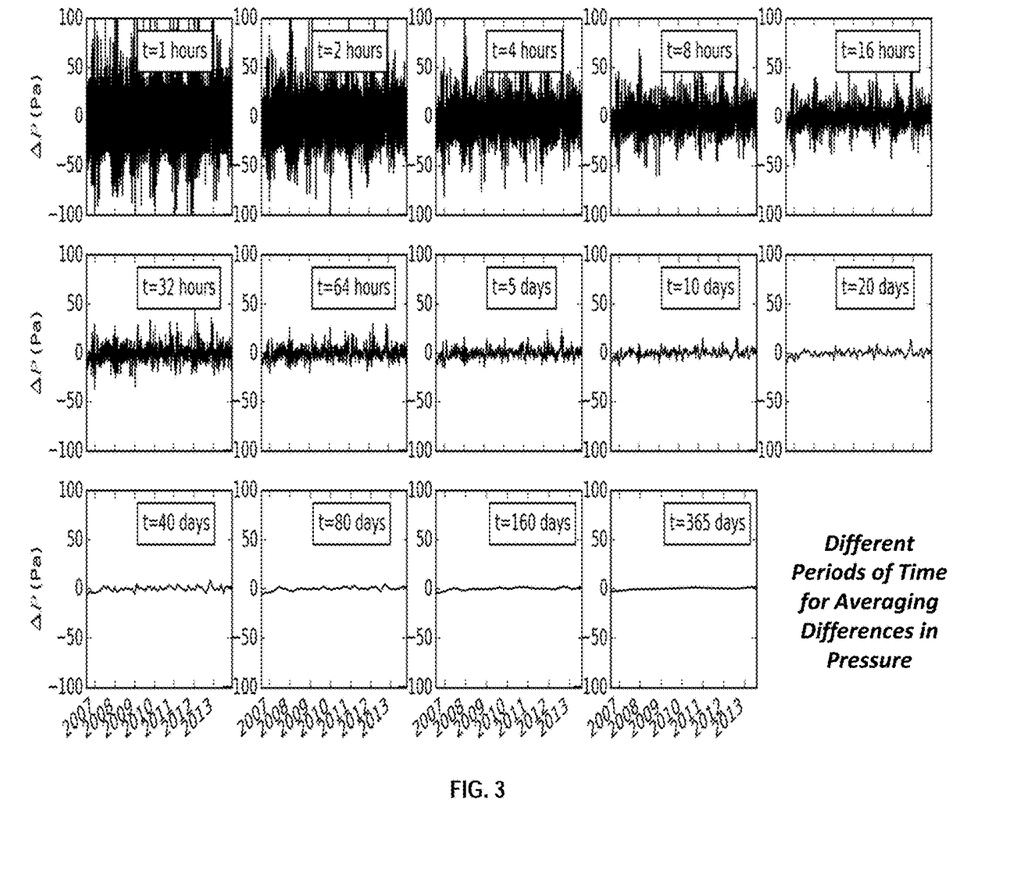
FIG. 3 shows average differences between measured pressures for two calibration sensors separated by an undisclosed distance over different periods of time.
Figure 4:
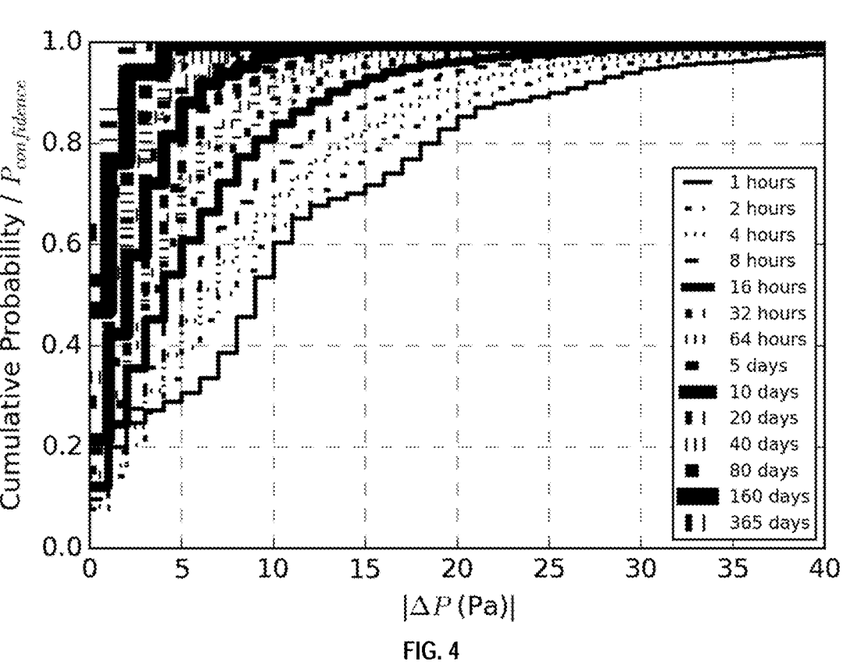
FIG. 4 illustrates a cumulative distribution of pressure differences for each of several periods of time.

By way of example, FIG. 3 shows average differences between measured pressures for two calibration sensors. The two calibration sensors are positioned at the same altitude, but are separated by an undisclosed distance over different periods of time, t. As shown, larger average differences tend to occur over shorter lengths of t due to occasional localized weather effects that affect one or both of the calibration sensors during that t. As t increases, however, the effect of localized weather is minimized and the average differences approach zero. FIG. 4 illustrates the cumulative distribution of |ΔP| for each of the time periods introduced in FIG. 3. Based on the data shown in FIG. 4, there is a minimum time over which the average difference between measured pressures from two locations will fall within a given threshold difference.

FIG. 3 and FIG. 4 illustrate that, in order to account for the effects of localized weather, it is beneficial to compare pressure differences from a calibration sensor and an unstable sensor over a suitable time period to reduce the contribution of the localized weather on the average of those pressure differences. Doing so provides an average difference in measured pressure that is mainly due to drift of the unstable sensor. Thus, when identifying an unstable sensor to be calibrated by a calibration sensor during step 210, the time period t over which pressure measurements from the unstable sensor and the calibration sensor are averaged must be considered.

FIG. 3 and FIG. 4 also show different averages of pressure differences over different t's for only one distance separating two calibration sensors. Varying the distance between two calibration sensors can vary the effects of localized weather, since differences in weather are more common across greater distances. The effects of varying the distance are discussed below in relation to FIG. 5, which provides an example of a model that shows the effects of distance on pressure differences for pairs of calibration sensors 120 and 121, 120 and 122, 120 and 123, and 120 and 124, which are separated by different distances (e.g. 10 km, 20 km, 40 km, and 60 km). For reference, these pairs of calibration sensors and the distances separating them are shown in FIG. 6.

Figure 5:
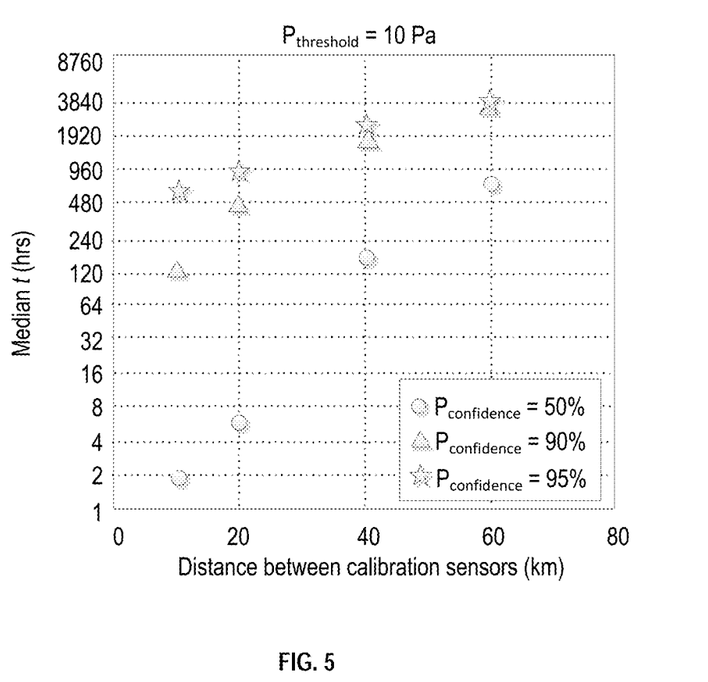
FIG. 5 illustrates a model for understanding the effects of distance and time on time-averaged pressure differences for pairs of calibration sensors.
Figure 6:
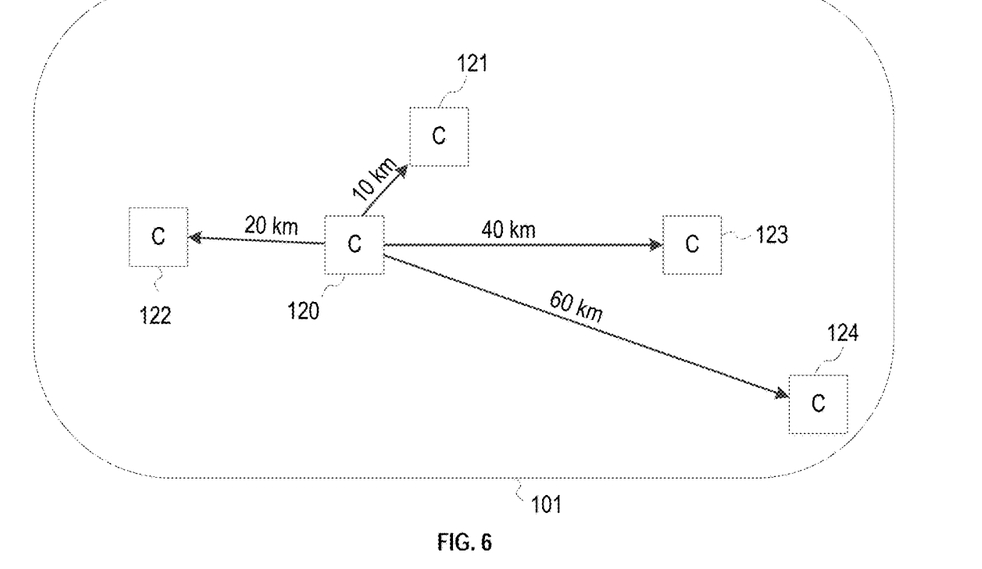
FIG. 6 depicts the pairs of calibration sensors introduced in FIG. 5.

As shown in FIG. 5, when the distance between a pair of calibration sensors increases, the amount of time t needed for the average of pressure differences to fall below a specified $P_{threshold}$ (e.g. 10 Pascals) also increases. This is mainly because the difference in localized weather around each of a pair of sensors separated by a larger distance is often greater than the difference in localized weather around each of a pair of sensors separated by a shorter distance, and/or the localized weather around each of the sensors separated by the larger distance is different more often than the localized weather around each of the sensors separated by the shorter distance. Thus, when identifying an unstable sensor to be calibrated by a calibration sensor during step 210, the distance d separating those sensors should also be considered along with t.

Collected data in FIG. 5 is indicated by the plotted stars, triangles and circles, which can be used to model estimates of other times needed for the average of pressure differences to fall below a specified $P_{threshold}$ given particular distances separating two sensors. Modeling the estimates can be carried using known mathematical approaches, including use of polynomial equations with fitting parameters that are derived from the collected data.

Figure 7:
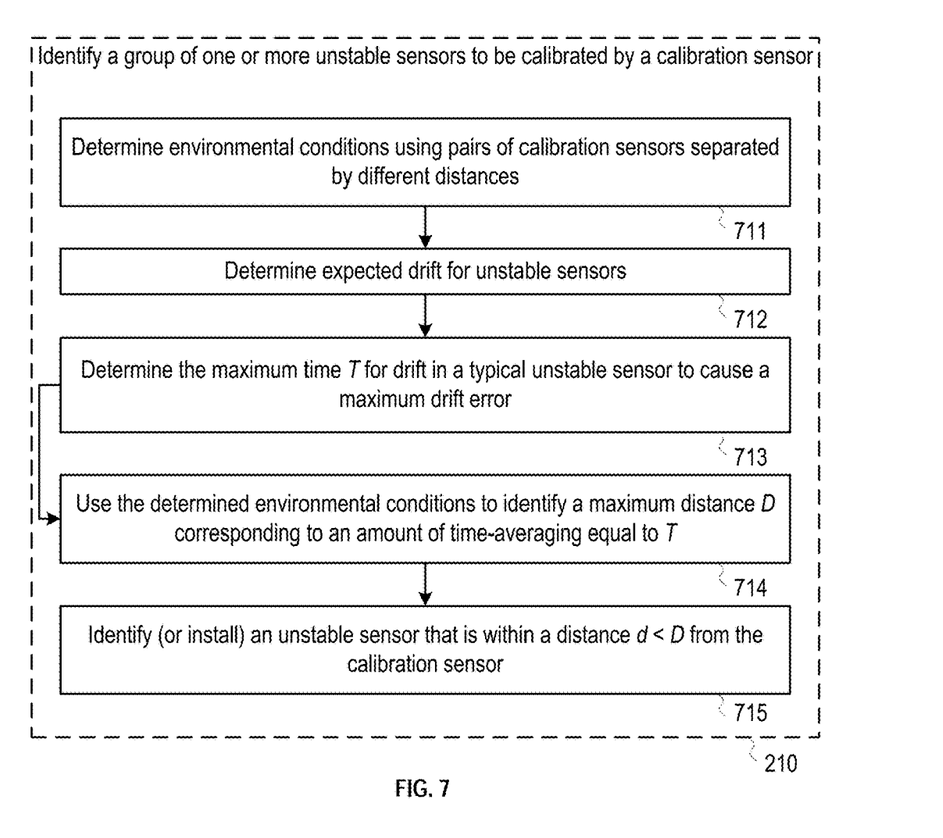
FIG. 7 details one approach that considers distance and time when identifying an unstable sensor to calibrate using a calibration sensor.

Attention is now turned to FIG. 7, which details one approach that considers distance and time when identifying which of the unstable sensors 110 are to be calibrated by the calibration sensor 120 during step 210. The approach shown in FIG. 7 uses pairs of calibration sensors separated by different distances, such as the calibration sensors 120-124 of FIG. 6, to determine a model of environmental conditions in the network 101 that shows different combinations of distance and time needed to achieve particular averages of pressure differences at different confidence levels (step 711)—e.g. an example of such a model is illustrated in FIG. 5. Additional steps of the approach shown in FIG. 7 include: determining expected drift for the unstable sensors 110 (step 712)—e.g. an average drift determined in a lab or designated in literature; determining the maximum time T for a typical unstable sensor to drift by a maximum drift error (step 713)—e.g. a maximum drift error of 10 Pascals; using the model of environmental conditions to identify a maximum distance D corresponding to an amount of time equal to T (step 714); and identifying (or installing) an unstable sensor that is within a distance d<D from the calibration sensor (step 715).

Various approaches may be used for selecting the distance d. In one embodiment, d may be an existing distance separating an unstable sensor and the calibration sensor.

In another embodiment, d could be a fraction of D (e.g. ½ or another fraction) so as to further reduce effects of localized weather on average differences of measured pressures such that most of the average difference is due to drift of an unstable sensor.

In yet another embodiment, d could be selected based on the density of the unstable sensors 110 in the network 101 so a particular condition is met. One condition may be that each calibration sensor in the network 101 calibrates the same number of unstable sensors. Another condition may be that no unstable sensor is within d of more than one calibration sensor.

Alternatively, d could correspond to a selected time period from the model that is less than T. The selected time period could be set to a preferred amount of time or a fraction thereof (e.g. when the average drift of an unstable sensor, or type of the unstable sensor, exceeds a tolerable level).

Figure 8:
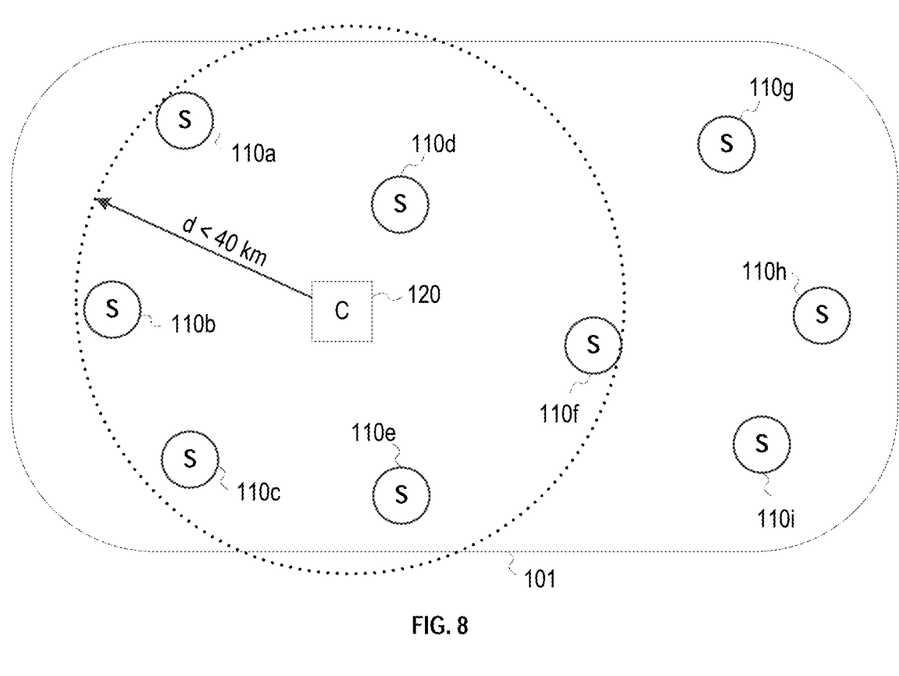
FIG. 8 depicts a group of unstable sensors that are selected to be calibrated using a calibration sensor.

With reference to FIG. 5 and FIG. 6, the following example illustrates how FIG. 7 can be implemented. During step 711, the model shown in FIG. 5 is determined using the pairs of the calibration sensors of FIG. 6. During steps 712 and 713, the maximum drift error is set to 10 Pascals, and it is determined that the typical unstable sensor accumulates 10 Pascals of error after 1920 hours. Thus, T=1920 hours. In step 714, the distance D from the model of FIG. 5 that corresponds to T is identified and a confidence level is selected. For purposes of this example, a confidence level of 95% is selected, and D=40 kilometers is identified. Then, during step 715, a group of sensors from the unstable sensors 110 within a distance d<40 kilometers from the calibration sensor 120 are identified as unstable sensors that will be evaluated to see if they can be calibrated using the calibration sensor 120. By way of example, FIG. 8 depicts such a group of sensors. As shown, the group includes the unstable sensors 110a-f, each of which is within a 40 km radius of the calibration sensor 120. The group does not include the unstable sensors 110g-i, which would be designated for calibration using a different calibration sensor (not shown).

Figure 9:
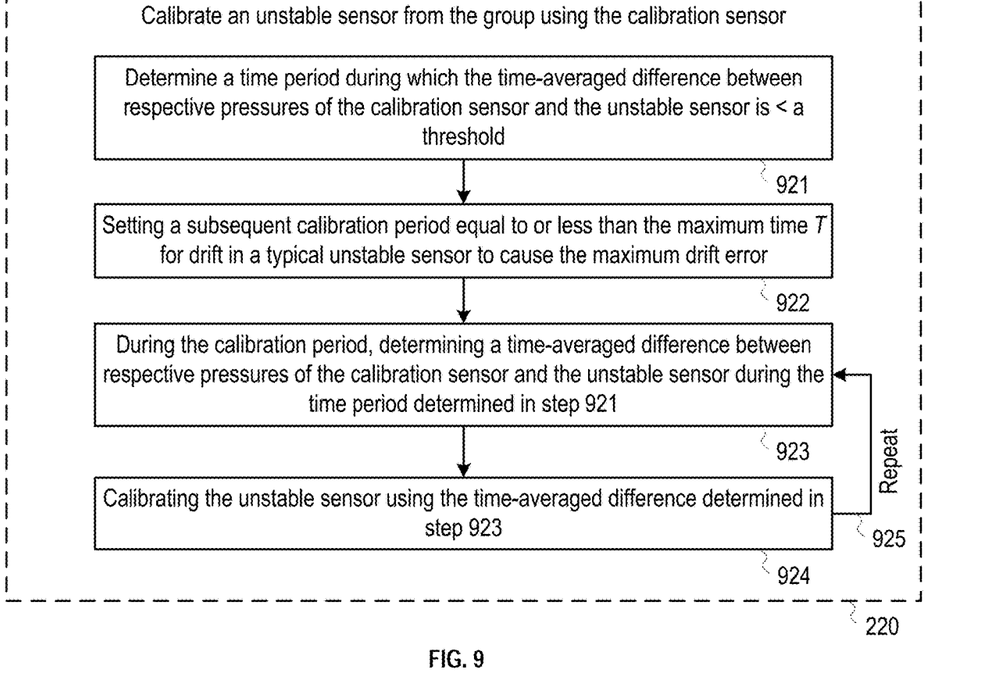
FIG. 9 details one approach for calibrating an unstable sensor using a calibration sensor.

Attention is now turned to FIG. 9, which details one approach for the step of calibrating an unstable sensor using a calibration sensor during step 220. The approach includes the steps of: determining a time period during which a time-averaged difference between pressures of the calibration sensor and the unstable sensor is less than a threshold (step 921)—e.g. a threshold of 10 Pascals, or other amount; setting a subsequent calibration period equal to the maximum time T for drift in a typical unstable sensor to cause the maximum drift error (step 922); during the time period determined in step 921, which occurs during the calibration period (e.g. at the end of the calibration period), determining a time-averaged difference between respective pressures of the calibration sensor and the unstable sensor (step 923); calibrating the unstable sensor using the time-averaged difference (step 924)—e.g. adjust future measurements of the unstable sensor by the time-averaged difference; and repeating steps 923 and 924 for subsequent calibration periods (step 925). The approach can be repeated individually for each unstable sensor of the group, or the time-averaged difference for one unstable sensor can be used to calibrate all of the unstable sensors of the group.

Figure 10:
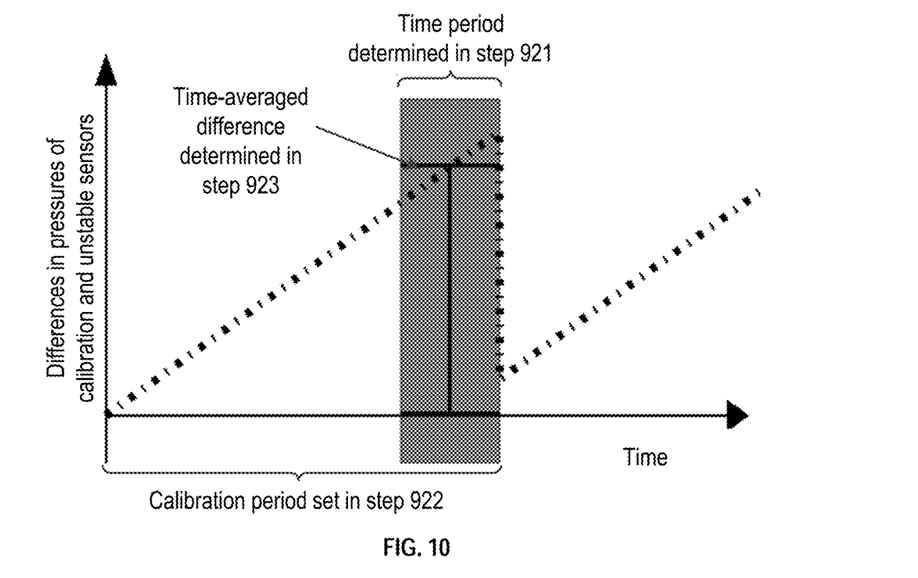
FIG. 10 illustrates one embodiment that uses the approach of FIG. 9.

By way of example, FIG. 10 illustrates one embodiment that uses the approach of FIG. 9. For the sake of simplicity, the differences in pressure measurements from the calibration sensor and the unstable sensor are illustrated as being linear. However, such differences need not be linear.

As shown in FIG. 10, the calibration period from step 922 is longer than the time period from step 921, and the time period from step 921 occurs at the end of the calibration period from step 922. Determining the average difference between the pressure measurements during the shorter time period from step 921 instead of over the entire calibration period permits the average difference to be as large as possible given the constraint of needing to average over some minimum time period (e.g. in this case, the time period from step 921, which is determined using the approach described below in FIG. 11). Consequently, the larger average difference, when used to calibrate the unstable sensor, will remove a maximum amount of measured pressure difference between the calibration sensor and the calibrated unstable sensor. Thus, this approach for calibrating does not eliminate drift, but instead mitigates the drift that occurred over the calibration period, which is better than removing a smaller amount of the drift.

Figure 11:
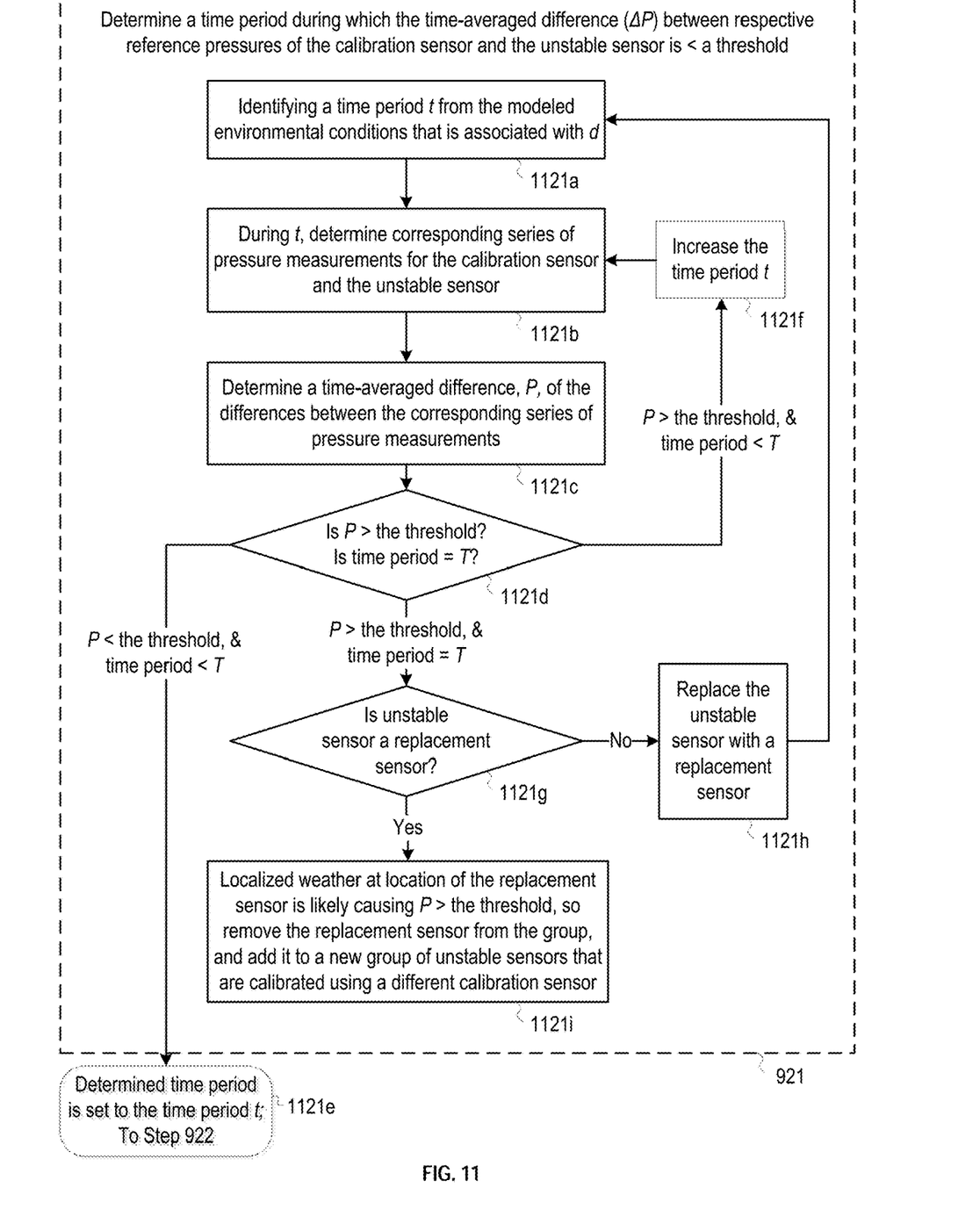
FIG. 11 details one approach for determining a time period during which a time-averaged difference between pressures of a calibration sensor and an unstable sensor is less than a threshold.

Attention is now turned to FIG. 11, which details one approach for determining a time period during which the time-averaged difference between pressures of the calibration sensor and the unstable sensor is less than a threshold during step 921 of FIG. 9. The approach includes the steps of: identifying a time period t from the modeled environmental conditions that is associated with the distance d from FIG. 7 (step 1121a); during t, determining a corresponding series of pressure measurements for the calibration sensor and the unstable sensor (step 1121b); determining a time-averaged difference between the pressure measurements (step 1121c); determining if the time-averaged difference is greater than the threshold and if the time period equals T (step 1121d); setting the time period to be determined to the current time period t when the time-averaged difference is less than or equal to the threshold and the time period is less than T, and continuing to step 922 of FIG. 9 (step 1121e); increasing the time period t when the time-averaged difference is greater than the threshold and the time period is less than T, and repeating steps 1121b-1121d (and optionally 1121e or 1121f) using the increased time period t (step 1121f); determining if the unstable sensor is a replacement sensor when the time-averaged difference is greater than the threshold and if the time period equals T (step 1121g); replacing the unstable sensor with a replacement sensor when the unstable sensor is not a replacement sensor, and then returning to step 1121a (step 1121h); and removing the replacement sensor from the group of sensors when the unstable sensor is a replacement sensor, and adding the replacement sensor to a new group of unstable sensors that are calibrated using a different calibration sensor (step 1121i). The different calibration sensor may already be designated to calibrate other unstable sensors of the new group, or the different calibration sensor may be installed to calibrate the replacement sensor.

In the example of FIG. 11, a replacement sensor is an unstable sensor that replaced a previous unstable sensor. For example, with reference to FIG. 8, if during the calibration of the sensor 110f, a new unstable sensor replaced the sensor 110f at step 1121i, that new sensor is a replacement sensor. One purpose of steps 1121g-i is to determine whether the larger than desired time-averaged difference is caused by more-than-expected drift of the original sensor during step 1121h, or if there are more-than-expected localized weather effects for the location of the original sensor during step 1121i.

Figure 12A:
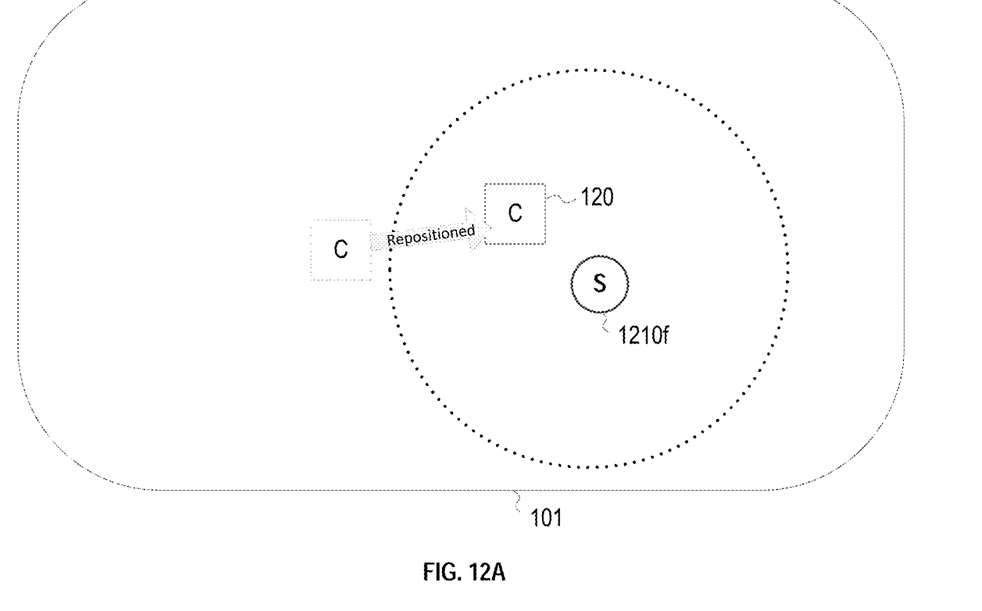
Figure 12B:
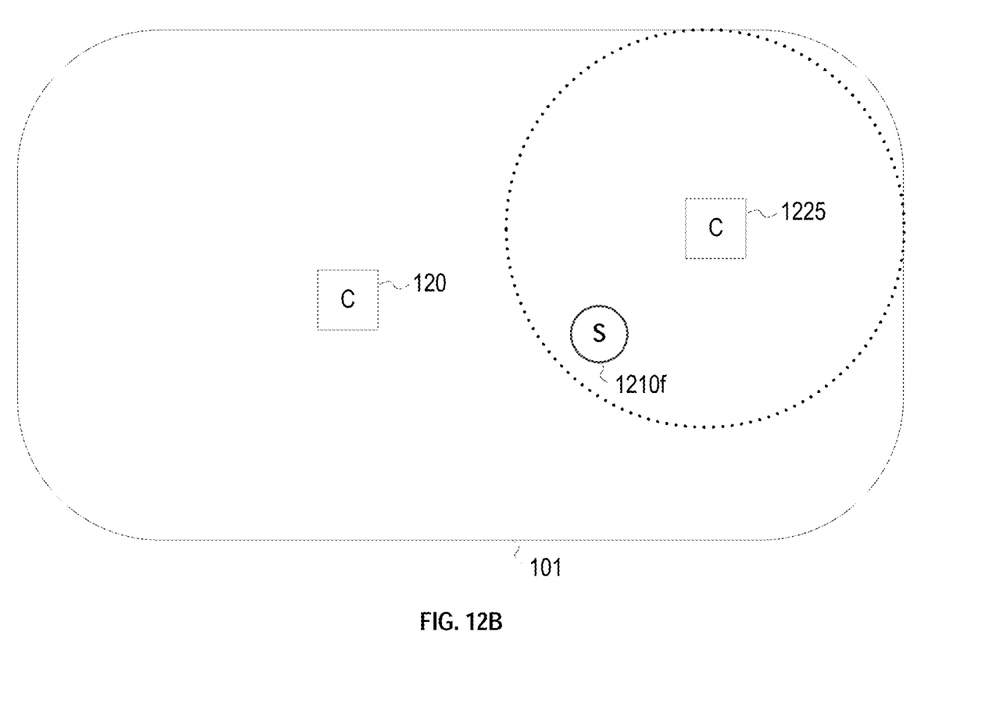
FIG. 12B illustrates an embodiment of FIG. 11 where a replacement sensor is calibrated using a different calibration sensor than the calibration sensor of FIG. 1A and FIG. 1B.

By way of example, FIG. 12A illustrates an embodiment for step 1121i where the calibration sensor 120 is repositioned closer to a replacement sensor 1210f to avoid introducing a new calibration sensor into the network 101. By contrast, FIG. 12B illustrates an embodiment for step 1121i where the replacement sensor 1210f is calibrated using a new calibration sensor 1225. In an alternative embodiment (not shown), the sensor 1210f could be moved to a new location without moving the calibration sensor 120 or designating the sensor 1210f for calibration using the new calibration sensor 1225.

Other Aspects

Discussion above relating to average differences in pressure measurements from two pressure sensors assumed that the pressure sensors were at the same altitude. However, in embodiments where the sensors are at different altitudes when measuring pressure, each pressure measurement from each sensor is converted to a reference pressure measurement corresponding to a reference altitude (e.g. sea-level or other altitude), and the differences in reference pressure measurements are averaged. Such conversions are known in the art.

An additional factor in the difference between pressure measurements of the calibration sensor and the unstable sensor includes noise at the unstable sensor, which can also be determined and smoothed out using the time average approach described herein.

Methods of this disclosure may be implemented by hardware, firmware or software. One or more non-transitory machine-readable media embodying program instructions that, when executed by one or more machines, cause the one or more machines to perform any of the described methods are also contemplated. As used herein, machine-readable media includes all forms of statutory machine-readable media (e.g. statutory non-volatile or volatile storage media, statutory removable or non-removable media, statutory integrated circuit media, statutory magnetic storage media, statutory optical storage media, or any other statutory storage media). As used herein, machine-readable media does not include non-statutory media. By way of example, machines may include one or more computing device(s), processor(s), controller(s), integrated circuit(s), chip(s), system(s) on a chip, server(s), programmable logic device(s), other circuitry, and/or other suitable means described herein or otherwise known in the art.

Method steps described herein may be order independent, and can therefore be performed in an order different from that described. It is also noted that different method steps described herein can be combined to form any number of methods, as would be understood by one of skill in the art. It is further noted that any two or more steps described herein may be performed at the same time. Any method step or feature disclosed herein may be expressly restricted from a claim for various reasons like achieving reduced manufacturing costs, lower power consumption, and increased processing efficiency. Method steps performed by a transmitter or a receiver can be performed by a server, or vice versa.

Systems comprising one or more modules that perform or are operable to perform different method steps/stages disclosed herein are also contemplated, where the modules are implemented using one or more machines listed herein or other suitable hardware.

In one or more embodiments, a method for using a calibration sensor to calibrate an unstable sensor identifies an unstable sensor in a geographic region to be calibrated by a calibration sensor, and calibrates the unstable sensor using the calibration sensor.

In one implementation of the method for using a calibration sensor to calibrate an unstable sensor, the unstable sensor may be identified, from among other unstable sensors, to be calibrated by the calibration sensor only when the distance separating the unstable sensor and the calibration sensor is less than a maximum distance. The maximum distance may be a distance identified from a model of environmental conditions for the geographic region that corresponds to an amount of time equal to a maximum time over which an expected amount of drift by the unstable sensor will reach a maximum drift error (e.g. 10 Pascals) based on an expected drift rate. The model may specify, for each of a plurality of different distances, a time period over which an average difference in measured pressures from two locations in the geographic region that are separated by that distance is less than or equal to a maximum difference. In one implementation, the model of environmental conditions is determined by: averaging, over different time periods, differences between pressure measurements at two locations in the geographic region that are separated by a first distance; and averaging, over the different time periods, differences between pressure measurements at two locations in the geographic region that are separated by a second distance.

In one implementation of the method for using a calibration sensor to calibrate an unstable sensor, the unstable sensor may be calibrated by: determining a time period during which an average of differences between pressure measurements from the calibration sensor and the unstable sensor is less than a pressure difference threshold (e.g. 10 Pascals); setting a calibration period equal to or less than a maximum time over which an expected amount of drift by the unstable sensor will reach a maximum drift error; determining an average of differences between pressure measurements from the calibration sensor and the unstable sensor taken over the time period during the calibration period; and calibrating the the unstable sensor using the average of differences between pressure measurements from the calibration sensor and the unstable sensor taken over the time period during the calibration period. The time period during which the first average of differences between pressure measurements from the calibration sensor and the unstable sensor is less than the pressure difference threshold may be determined by: identifying a first time period from a model of environmental conditions that is associated with a distance separating the unstable sensor and calibration sensor, and that is less than the maximum time over which the expected amount of drift by the unstable sensor will reach the maximum drift error; determining, during the first time period, a first average of differences between pressure measurements from the calibration sensor and the unstable sensor; and determining if the first average is greater than the pressure difference threshold. If the first average is less than or equal to the pressure difference threshold, the time period may be set to the first time period. If the first average is greater than the pressure difference threshold, the time period may be determined by: identifying a second time period from a model of environmental conditions that is greater than the first time period and less than the maximum time over which the expected amount of drift by the unstable sensor will reach the maximum drift error; determining, during the second time period, a second average of differences between pressure measurements from the calibration sensor and the unstable sensor; and determining if the second average is greater than the pressure difference threshold. If the second average is less than or equal to the pressure difference threshold, the time period may be set to the second time period. If the second average is greater than the pressure difference threshold, a third time period may be identified, and the following steps may be performed: determining if the third time period is greater than the maximum time over which the expected amount of drift by the unstable sensor will reach the maximum drift error; determining, if the third time period is greater than the maximum time, whether the unstable sensor is a replacement sensor; generating, if the unstable sensor is not a replacement sensor, data specifying that the unstable sensor is to be replaced; and generating, if the unstable sensor is a replacement sensor, data specifying that the unstable sensor is to be calibrated by another calibration sensor.

When two things (e.g. modules or other features) are "coupled to" each other, those two things may be directly connected together (e.g. shown by a line connecting the two things in the drawings), or separated by one or more intervening things. Where no lines and intervening things connect two particular things, coupling of those things is contemplated unless otherwise stated. Where an output of one thing and an input of another thing are coupled to each other, information (e.g. data and/or signaling) sent from the output is received by the input even if the data passes through one or more intermediate things. All information disclosed herein may be transmitted over any communication pathway using any protocol. Data, instructions, commands, information, signals, bits, symbols, and chips and the like may be represented by voltages, currents, electromagnetic waves, magnetic fields or particles, or optical fields or particles.

The words comprise, comprising, include, including and the like are to be construed in an inclusive sense (i.e. not limited to) as opposed to an exclusive sense (i.e. consisting only of). Words using the singular or plural number also include the plural or singular number, respectively. The word or and the word and, as used in the Detailed Description, cover any of the items and all of the items in a list. The words some, any and at least one refer to one or more. The term may is used herein to indicate an example, not a requirement—e.g. a thing that may perform an operation or may have a characteristic need not perform that operation or have that characteristic in each embodiment, but that thing performs that operation or has that characteristic in at least one embodiment.

The invention claimed is:

1. A method for using a calibration sensor to calibrate an unstable sensor, the method comprising:
    identifying an unstable sensor in a geographic region to be calibrated by a calibration sensor,
    wherein the identifying comprises identifying the unstable sensor, from among other unstable sensors, to be calibrated by the calibration sensor only when a distance separating the unstable sensor and the calibration sensor is less than a maximum distance,
    wherein the maximum distance is a distance identified from a model of environmental conditions for the geographic region that corresponds to an amount of time equal to a maximum time over which an expected amount of drift by the unstable sensor will reach a maximum drift error based on an expected drift rate; and
    calibrating the unstable sensor using the calibration sensor.

2. The method of claim 1, wherein the calibrating comprises:
    determining a time period during which an average of differences between pressure measurements from the calibration sensor and the unstable sensor is less than a pressure difference threshold;
    setting a calibration period equal to or less than the maximum time over which the expected amount of drift by the unstable sensor will reach the maximum drift error;
    during the calibration period, determining an additional average of differences between pressure measurements from the calibration sensor and the unstable sensor taken over the determined time period; and
    calibrating the unstable sensor using the additional average of differences between pressure measurements from the calibration sensor and the unstable sensor taken over the determined time period during the calibration period.

3. The method of claim 2, wherein determining a time period during which an average of differences between pressure measurements from the calibration sensor and the unstable sensor is less than a pressure difference threshold comprises:
    identifying a first time period from a model of environmental conditions that is associated with a distance separating the unstable sensor and calibration sensor, and that is less than the maximum time over which the expected amount of drift by the unstable sensor will reach the maximum drift error;
    determining, during the first time period, a first average of differences between pressure measurements from the calibration sensor and the unstable sensor;
    determining if the first average is greater than the pressure difference threshold; and
    if the first average is less than or equal to the pressure difference threshold, setting the time period to the first time period.

4. The method of claim 3, wherein if the first average is greater than the pressure difference threshold, the method comprises:
    identifying a second time period from the model of environmental conditions that is greater than the first time period and less than the maximum time over which the expected amount of drift by the unstable sensor will reach the maximum drift error;
    determining, during the second time period, a second average of differences between pressure measurements from the calibration sensor and the unstable sensor;
    determining if the second average is greater than the pressure difference threshold; and
    if the second average is less than or equal to the pressure difference threshold, setting the time period to the second time period.

5. The method of claim 4, wherein if the second average is greater than the pressure difference threshold, the method comprises:
    identifying an additional time period;
    determining if the additional time period is greater than the maximum time over which the expected amount of drift by the unstable sensor will reach the maximum drift error;
    determining, if the additional time period is greater than the maximum time, whether the unstable sensor is a replacement sensor;
    generating, if the unstable sensor is not a replacement sensor, data specifying that the unstable sensor is to be replaced; and
    generating, if the unstable sensor is a replacement sensor, data specifying that the unstable sensor is to be calibrated by another calibration sensor.

6. The method of claim 3, wherein if the first average is greater than the pressure difference threshold, the method comprises:
    identifying an additional time period;
    determining if the additional time period is greater than the maximum time over which the expected amount of drift by the unstable sensor will reach the maximum drift error;
    determining, if the additional time period is greater than the maximum time, whether the unstable sensor is a replacement sensor;
    generating, if the unstable sensor is not a replacement sensor, data specifying that the unstable sensor is to be replaced; and
    generating, if the unstable sensor is a replacement sensor, data specifying that the unstable sensor is to be calibrated by another calibration sensor.

7. The method of claim 1, wherein the model of environmental conditions specifies different combinations of distances and times, wherein each time for each combination of distance and time represents an amount of time needed for an average of differences in pressure measured at locations separated by the distance of the combination to be below a pressure difference threshold.

8. The method of claim 1, wherein the model of environmental conditions specifies, for each of a plurality of different distances, a time period over which an average difference in measured pressures from two locations in the geographic region that are separated by that distance is less than or equal to a maximum difference.

9. The method of claim 8, wherein the model of environmental conditions is determined by:
averaging, over different time periods, differences between pressure measurements at two locations in the geographic region that are separated by a first distance; and
averaging, over the different time periods, differences between pressure measurements at two locations in the geographic region that are separated by a second distance.

10. The method of claim 1, wherein the maximum drift error is 10 Pascals.

11. A method for using a calibration sensor to calibrate an unstable sensor, wherein the method comprises:
identifying an unstable sensor in a geographic region to be calibrated by a calibration sensor; and
calibrating the unstable sensor using the calibration sensor, wherein the calibrating comprises:
(i) determining a time period during which an average of differences between pressure measurements from the calibration sensor and the unstable sensor is less than a pressure difference threshold;
(ii) setting a calibration period equal to or less than a maximum time over which an expected amount of drift by the unstable sensor will reach a maximum drift error;
(iii) during the calibration period, determining an additional average of differences between pressure measurements from the calibration sensor and the unstable sensor taken over the determined time period; and
(iv) calibrating the unstable sensor using the additional average of differences between pressure measurements from the calibration sensor and the unstable sensor taken over the determined time period during the calibration period.

12. The method of claim 11, wherein calibrating the unstable sensor using the additional average of differences comprises: adjusting a measurement from the unstable sensor by the additional average of differences.

13. The method of claim 11, wherein determining a time period during which an average of differences between pressure measurements from the calibration sensor and the unstable sensor is less than a pressure difference threshold comprises:
identifying a first time period from a model of environmental conditions that is associated with a distance separating the unstable sensor and calibration sensor, and that is less than the maximum time over which the expected amount of drift by the unstable sensor will reach the maximum drift error;
determining, during the first time period, a first average of differences between pressure measurements from the calibration sensor and the unstable sensor;
determining if the first average is greater than the pressure difference threshold; and
if the first average is less than or equal to the pressure difference threshold, setting the time period to the first time period.

14. The method of claim 13, wherein if the first average is greater than the pressure difference threshold, the method comprises:
identifying a second time period from the model of environmental conditions that is greater than the first time period and less than the maximum time over which the expected amount of drift by the unstable sensor will reach the maximum drift error;
determining, during the second time period, a second average of differences between pressure measurements from the calibration sensor and the unstable sensor;
determining if the second average is greater than the pressure difference threshold; and
if the second average is less than or equal to the pressure difference threshold, setting the time period to the second time period.

15. The method of claim 14, wherein if the second average is greater than the pressure difference threshold, the method comprises:
identifying an additional time period;
determining if the additional time period is greater than the maximum time over which the expected amount of drift by the unstable sensor will reach the maximum drift error;
determining, if the additional time period is greater than the maximum time, whether the unstable sensor is a replacement sensor;
generating, if the unstable sensor is not a replacement sensor, data specifying that the unstable sensor is to be replaced; and
generating, if the unstable sensor is a replacement sensor, data specifying that the unstable sensor is to be calibrated by another calibration sensor.

16. The method of claim 13, wherein if the first average is greater than the pressure difference threshold, the method comprises:
identifying an additional time period;
determining if the additional time period is greater than the maximum time over which the expected amount of drift by the unstable sensor will reach the maximum drift error;
determining, if the additional time period is greater than the maximum time, whether the unstable sensor is a replacement sensor;
generating, if the unstable sensor is not a replacement sensor, data specifying that the unstable sensor is to be replaced; and
generating, if the unstable sensor is a replacement sensor, data specifying that the unstable sensor is to be calibrated by another calibration sensor.

17. One or more non-transitory machine-readable media embodying program instructions that, when executed by one or more machines, cause the one or more machines to perform a method for using a calibration sensor to calibrate an unstable sensor, the method comprising:
identifying an unstable sensor in a geographic region to be calibrated by a calibration sensor,
wherein the identifying comprises identifying the unstable sensor, from among other unstable sensors, to be calibrated by the calibration sensor only when a distance separating the unstable sensor and the calibration sensor is less than a maximum distance,
wherein the maximum distance is a distance identified from a model of environmental conditions for the geographic region that corresponds to an amount of time equal to a maximum time over which an expected amount of drift by the unstable sensor will reach a maximum drift error based on an expected drift rate; and
calibrating the unstable sensor using the calibration sensor.

18. The non-transitory machine-readable media of claim 17, wherein the calibrating comprises:
   determining a time period during which an average of differences between pressure measurements from the calibration sensor and the unstable sensor is less than a pressure difference threshold;
   setting a calibration period equal to or less than the maximum time over which the expected amount of drift by the unstable sensor will reach the maximum drift error;
   during the calibration period, determining an additional average of differences between pressure measurements from the calibration sensor and the unstable sensor taken over the determined time period; and
   calibrating the unstable sensor using the additional average of differences between pressure measurements from the calibration sensor and the unstable sensor taken over the determined time period during the calibration period.

19. The non-transitory machine-readable media of claim 18, wherein determining a time period during which an average of differences between pressure measurements from the calibration sensor and the unstable sensor is less than a pressure difference threshold comprises:
   identifying a first time period from a model of environmental conditions that is associated with a distance separating the unstable sensor and calibration sensor, and that is less than the maximum time over which the expected amount of drift by the unstable sensor will reach the maximum drift error;
   determining, during the first time period, a first average of differences between pressure measurements from the calibration sensor and the unstable sensor;
   determining if the first average is greater than the pressure difference threshold; and
   if the first average is less than or equal to the pressure difference threshold, setting the time period to the first time period.

20. The non-transitory machine-readable media of claim 19, wherein if the first average is greater than the pressure difference threshold, the method comprises:
   identifying a second time period from the model of environmental conditions that is greater than the first time period and less than the maximum time over which the expected amount of drift by the unstable sensor will reach the maximum drift error;
   determining, during the second time period, a second average of differences between pressure measurements from the calibration sensor and the unstable sensor;
   determining if the second average is greater than the pressure difference threshold; and
   if the second average is less than or equal to the pressure difference threshold, setting the time period to the second time period.

21. The non-transitory machine-readable media of claim 20, wherein if the second average is greater than the pressure difference threshold, the method comprises:
   identifying an additional time period;
   determining if the additional time period is greater than the maximum time over which the expected amount of drift by the unstable sensor will reach the maximum drift error;
   determining, if the additional time period is greater than the maximum time, whether the unstable sensor is a replacement sensor;
   generating, if the unstable sensor is not a replacement sensor, data specifying that the unstable sensor is to be replaced; and
   generating, if the unstable sensor is a replacement sensor, data specifying that the unstable sensor is to be calibrated by another calibration sensor.

22. The non-transitory machine-readable media of claim 19, wherein if the first average is greater than the pressure difference threshold, the method comprises:
   identifying an additional time period;
   determining if the additional time period is greater than the maximum time over which the expected amount of drift by the unstable sensor will reach the maximum drift error;
   determining, if the additional time period is greater than the maximum time, whether the unstable sensor is a replacement sensor;
   generating, if the unstable sensor is not a replacement sensor, data specifying that the unstable sensor is to be replaced; and
   generating, if the unstable sensor is a replacement sensor, data specifying that the unstable sensor is to be calibrated by another calibration sensor.

23. The non-transitory machine-readable media of claim 17, wherein the model of environmental conditions specifies different combinations of distances and times, wherein each time for each combination of distance and time represents an amount of time needed for an average of differences in pressure measured at locations separated by the distance of the combination to be below a pressure difference threshold.

24. The non-transitory machine-readable media of claim 17, wherein the model of environmental conditions specifies, for each of a plurality of different distances, a time period over which an average difference in measured pressures from two locations in the geographic region that are separated by that distance is less than or equal to a maximum difference.

25. The non-transitory machine-readable media of claim 24, wherein the model of environmental conditions is determined by:
   averaging, over different time periods, differences between pressure measurements at two locations in the geographic region that are separated by a first distance; and
   averaging, over the different time periods, differences between pressure measurements at two locations in the geographic region that are separated by a second distance.

26. The non-transitory machine-readable media of claim 17, wherein the maximum drift error is 10 Pascals.

27. One or more non-transitory machine-readable media embodying program instructions that, when executed by one or more machines, cause the one or more machines to perform a method for using a calibration sensor to calibrate an unstable sensor, wherein the method comprises:
   identifying an unstable sensor in a geographic region to be calibrated by a calibration sensor; and
   calibrating the unstable sensor using the calibration sensor, wherein the calibrating comprises:
      (i) determining a time period during which an average of differences between pressure measurements from the calibration sensor and the unstable sensor is less than a pressure difference threshold;
      (ii) setting a calibration period equal to or less than a maximum time over which an expected amount of drift by the unstable sensor will reach a maximum drift error;

(iii) during the calibration period, determining an additional average of differences between pressure measurements from the calibration sensor and the unstable sensor taken over the determined time period; and (iv) calibrating the unstable sensor using the additional average of differences between pressure measurements from the calibration sensor and the unstable sensor taken over the determined time period during the calibration period.

28. The non-transitory machine-readable media of claim 27, wherein calibrating the unstable sensor using the additional average of differences comprises adjusting a measurement from the unstable sensor by the additional average of differences.

29. The non-transitory machine-readable media of claim 27, wherein determining a time period during which an average of differences between pressure measurements from the calibration sensor and the unstable sensor is less than a pressure difference threshold comprises:

identifying a first time period from a model of environmental conditions that is associated with a distance separating the unstable sensor and calibration sensor, and that is less than the maximum time over which the expected amount of drift by the unstable sensor will reach the maximum drift error;

determining, during the first time period, a first average of differences between pressure measurements from the calibration sensor and the unstable sensor;

determining if the first average is greater than the pressure difference threshold; and if the first average is less than or equal to the pressure difference threshold, setting the time period to the first time period.

30. The non-transitory machine-readable media of claim 29, wherein if the first average is greater than the pressure difference threshold, the method comprises:

identifying a second time period from the model of environmental conditions that is greater than the first time period and less than the maximum time over which the expected amount of drift by the unstable sensor will reach the maximum drift error;

determining, during the second time period, a second average of differences between pressure measurements from the calibration sensor and the unstable sensor;

determining if the second average is greater than the pressure difference threshold; and if the second average is less than or equal to the pressure difference threshold, setting the time period to the second time period.

31. The non-transitory machine-readable media of claim 30, wherein if the second average is greater than the pressure difference threshold, the method comprises:

identifying an additional time period;

determining if the additional time period is greater than the maximum time over which the expected amount of drift by the unstable sensor will reach the maximum drift error;

determining, if the additional time period is greater than the maximum time, whether the unstable sensor is a replacement sensor;

generating, if the unstable sensor is not a replacement sensor, data specifying that the unstable sensor is to be replaced; and generating, if the unstable sensor is a replacement sensor, data specifying that the unstable sensor is to be calibrated by another calibration sensor.

32. The non-transitory machine-readable media of claim 29, wherein if the first average is greater than the pressure difference threshold, the method comprises:

identifying an additional time period;

determining if the additional time period is greater than the maximum time over which the expected amount of drift by the unstable sensor will reach the maximum drift error;

determining, if the additional time period is greater than the maximum time, whether the unstable sensor is a replacement sensor;

generating, if the unstable sensor is not a replacement sensor, data specifying that the unstable sensor is to be replaced; and generating, if the unstable sensor is a replacement sensor, data specifying that the unstable sensor is to be calibrated by another calibration sensor.

* * * * *